United States Patent [19]
Maillocheau

[11] 3,748,703

[45] July 31, 1973

[54] CLIP HOOK FOR FASTENING DEVICES SUCH AS SPIDERS FOR SECURING OBJECTS ONTO LUGGAGE CARRIERS

[75] Inventor: Camille Jean Maillocheau, Tours, France

[73] Assignee: Royoda Societe A. Responsabilite Limitee Dite, Montreuil (Seine Saint Denis), France

[22] Filed: July 23, 1971

[21] Appl. No.: 165,059

[30] Foreign Application Priority Data
July 30, 1970 France..........................7028228
Dec. 15, 1970 France..........................7045204

[52] U.S. Cl. ............................................. 24/265 SH
[51] Int. Cl. ............................................. A44c 5/18
[58] Field of Search .................... 24/73 HH, 73 HR, 24/231, 236, 265 H, 265 SH, 81 AF, 81 AG

[56] References Cited
UNITED STATES PATENTS

| | | | |
|---|---|---|---|
| 339,039 | 3/1886 | Bernd .................................. | 24/236 |
| 664,814 | 12/1900 | Manes ........................ | 24/265 SH X |
| 1,762,882 | 6/1930 | Ninnermun ................. | 24/265 SH X |
| 1,852,689 | 4/1932 | Baxter............................... | 24/231 X |
| 2,059,825 | 11/1936 | Talbott ........................ | 24/265 H X |

FOREIGN PATENTS OR APPLICATIONS

| | | | |
|---|---|---|---|
| 1,188,738 | 3/1959 | France ............................ | 24/73 HH |
| 413,694 | 5/1925 | Germany ............................. | 24/236 |

*Primary Examiner*—Donald A. Griffin
*Attorney*—Richard D. Mason, Andrew J. Bootz et al.

[57] ABSTRACT

A snap hook for fastening to the end of an elongated tension member such as an elastic cord to form a spider of cords for securing an object onto a roof-rack of an automobile, said hook formed of integrally moulded plastic material produced, for instance, by injection moulding.

To give the snap hook sufficient strength, its end and the corresponding end of the clip are each provided with a coupling element which engage in one another thereby making a closed loop.

7 Claims, 5 Drawing Figures

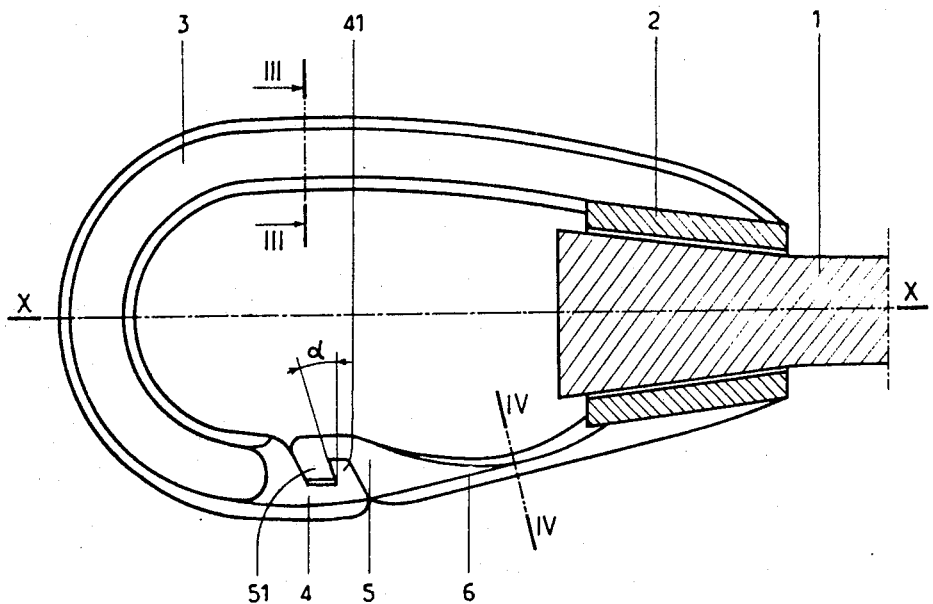
Fig.1
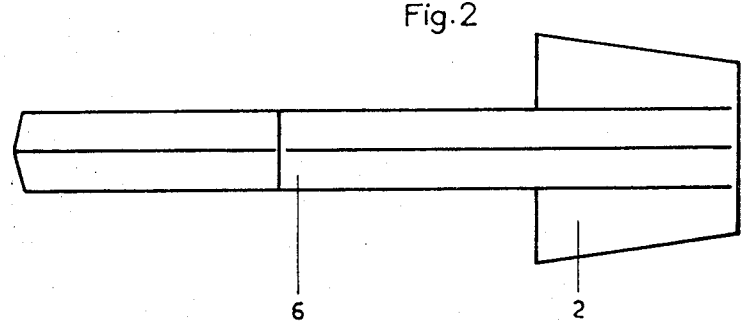
Fig.2
Fig.3
Fig.4
INVENTOR:
CAMILLE JEAN MAILLOCHEAU,
BY: Mason, Kolehmainen, Rathburn & Wyss,
ATTORNEYS.

3,748,703

CLIP HOOK FOR FASTENING DEVICES SUCH AS SPIDERS FOR SECURING OBJECTS ONTO LUGGAGE CARRIERS

The present invention relates to fastening devices and, more particularly, to fastening devices such as spiders for securing objects onto a roof-rack of an automobile or similar devices, provided with snap-hooks at each of their ends.

The object of the present invention is to provide a simple snap hook made of plastic material and having excellent tensile strength compared with known hooks.

It is also the object of the invention to provide a snap hook in which the shape and inclination of the contact surfaces of the hook and of the clip become self-coupling when the snap hook is subjected to a pull.

It is further the object of this invention to provide a snap hook having a clip biased to push against the end of the hook portion to form a closed loop without any risk of opening accidentally.

Another object of the invention is to provide a snap hook whose coupling surfaces comprise a means of connection as an additional securing means when in use.

Still another object of the invention is to provide a snap hook which when fastened to the end of a cord of a spider is always closed and does not hook itself to, or becomes entangled with other cords of the spider.

To this end, the present invention relates to a new and improved snap hook, made of a single piece of injection moulded plastic material for fastening onto the end of an elastic member, such as one of the tension cords of a spider, the hook comprising means for fastening the same to one end of an elastic cord or the like, this means being formed by a truncated sleeve in which is fixed the end of the elastic cord, a hook portion having one end forming part of the sleeve and another end comprises a coupling element, a second coupling element having one end attached to the sleeve and designed to open and close with the coupling element of the hook to normally form a closed loop suitable for engagement and transmission of tension forces exerted on the loop by a cord of the spider fastened thereto, the loop in this condition being then able to withstand greater forces than an open hook alone.

According to another interesting characteristic feature, the rim and groove have a cylindrical shape, the genetrices of the cylinder being perpendicular to the line of force acting upon the clip.

Since a certain pull is exerted on the coupling elements, the pull results in a self-locking operation which constitutes a second safety measure. The hook then forms a closed loop of great strength.

Finally, the invention relates also to fastening devices and is especially useful with spiders, provided with one or a plurality of cords having snap hooks as described above.

The present invention will now be described in greater details with the aid of mode of application illustrated in the accompanying drawings in which :

FIG. 1 is a longitudinal section of a snap hook according to the invention.

FIG. 2 is a view of the snap hook seen from above according to FIG. 1.

FIG. 3 is a partial cross-section along III—III in FIG. 1.

FIG. 4 is a cross-sectional view along IV-IV in FIG. 1.

Figure 5:
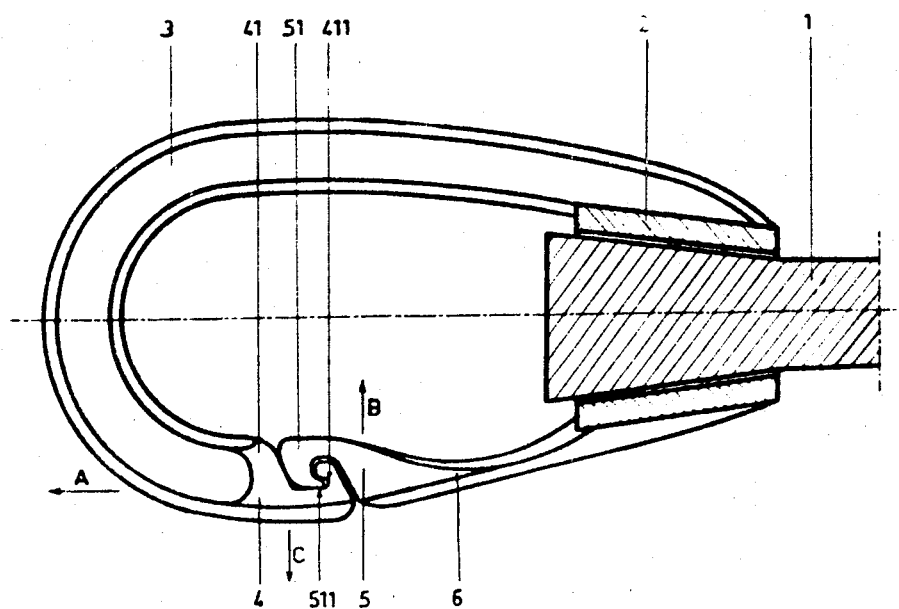
FIG. 5 is a variant in the construction of the snap hook according to the invention.

The snap hook according to the invention, illustrated in the various figures, is made by injection moulding or moulding in one piece or several pieces.

The snap hook is designed to be fastened to the end of a sheaf or cord 1 of rubber strands or similar, represented schematically.

To this end, the snap hook comprises a truncated sleeve 2 and an integral hook portion 3, which terminate in a coupling element 4. The element 4 is engageable cooperating with a corresponding coupling element 5 on the outer end of a clip 6 having an opposite end joined integrally to the sleeve 2.

The snap hook is formed of an elastic material, and the clip 6 is sufficiently elastic to be deflectable and disengage from the hook portion 3 to allow the snap hook to be fastened and hooked onto a luggage carrier or similar device.

However, as this material of the snap hook is not sufficiently strong to constitute an open hook which alone withstands the pull exerted on the sheaf 1, the elements 4 and 5 engage to form a closed loop to resist pull exerted along the access of symmetry of the snap hook.

To this end, the lugs 41 and 51 of the coupling elements 4 and 5 when engaged, are located in a plane making a certain angle with respect to the plane perpendicular to the axis of symmetry XX of the hook. This angle however, is sufficiently small to enable the two coupling elements 4 and 5 to be uncoupled by deflection of the clip member 6 inwardly. In a particular mode of construction, this angle can be of the order of 8°.

In addition, to make the clip 6 more elastic, it is made smaller at the level of the plane of the cross-section IV—IV.

The cross-section of the hook portion 3 has the form of an H as shown in FIG. 3. This cross-section has the advantage of having great strength while remaining sufficiently elastic. The clip 6 has a cross-section in the shape of a rhombus as shown in FIG. 4.

According to the variant shown in FIG. 5, the snap hook according to the invention comprises a truncated sleeve 2, adapted to be secured to the end of a cord of a spider 1 and a hook portion 3 terminating in a coupling element 4. The coupling element 4 cooperates with a corresponding element 5 on a deflectable clip 6 joined with the sleeve 2.

Lugs 41 and 51 of the coupling elements 4 and 5 are arranged at a certain angle with respect to the plane perpendicular to the axis of symmetry of the hook.

In addition the lugs are provided with locking elements 411, 511. The male locking element 511 comprising part of the coupling element 5, includes a rim perpendicular to the plane of symmetry of the clip. The female locking element 411 or groove formed in the coupling element 4 is formed in the shape of the rim.

As seen in FIG. 5, a pull exerted on the cord 1 produces a reaction, exerted in the direction of the arrow A, which locks the element 511 in the element 411 and prevents the separation of the coupling elements 4 and 5 by opening of the hook.

Thus, the elements 4 and 5 might have the tendancy to separate in the direction of the arrows B and C were it not for the elements 411 and 511.

The snap hook according to the present invention is made of a plastic material and, for that reason, the clip 6 is sufficiently elastic to be able to disengage itself from the buckle 3 by simple manual pressure.

The snap hooks such as described above are particularly suitable for elastic fastening devices or other devices such as spiders.

It is obvious that the invention is not limited to the examples of its application herein above described and illustrated, on the basis of which other modes and forms of application can be envisaged within the scope of the invention.

I claim:

1. A snap hook formed in a unitary one piece structure of injection molded flexible plastic material comprising:

an annular sleeve having an axial bore adapted to receive one end of an elongated tension member, a flexible hook member having one end integrally joining said sleeve and a curved outer end portion, a flexible clip member having one end integrally joining said sleeve and a free outer end portion engageable with said outer end portion of said hook shaped member to form a normally closed loop extending outwardly of one end of said sleeve on a plane coincident with the axis of said bore, said members having detachably engageable coupling elements adjacent their outer ends with locking surfaces extended in a direction generally transversely of said bore axis and lockingly engaging said members to form said closed loop to resist bending of said hook member when said loop is under tension along said axis, at least one of said members being defectable laterally of said axis to permit relative deflection of said coupling elements away from each other in said generally transverse direction to open said loop.

2. The snap hook of claim 1 wherein said locking surfaces extend in a direction inclined at an acute angle relative to said bore axis and along the direction of relative deflection between said elements for opening said loop.

3. The snap hook of claim 1 wherein said clip member has a portion intermediate its ends of reduced cross-section permitting manual deflection of the coupling element on the outer end thereof away from the coupling element of the hook member to open said loop.

4. The snap hook of claim 3 wherein said portion of reduced cross-section is rhombic in cross-section and said hook portion is of substantially greater cross-sectional area.

5. The snap hook of claim 1 wherein said coupling elements comprise a male lug on one of said members and groove means defined in the other of said members for receiving said lug when said hook members and clip member are interlocked forming said closed loop, said locking surfaces formed on said lug and groove means along the direction of lateral deflection between said members when said loop is opened.

6. The snap hook of claim 5 wherein said lug and groove means include second latching surfaces engaging one another when said loop is closed, said second surfaces extending generally parallel of said bore axis.

7. The snap hook of claim 6 wherein said lug and groove means extend normal to said plane of said closed loop.

* * * * *